(12) United States Patent
Healy et al.

(10) Patent No.: US 7,132,191 B2
(45) Date of Patent: Nov. 7, 2006

(54) ADDRESSING ONE MEA FAILURE MODE BY CONTROLLING MEA CATALYST LAYER OVERLAP

(75) Inventors: John P. Healy, Pittsford, NY (US); Anastasios Angelopoulos, Fairport, NY (US); Clark G Hochgraf, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 216 days.

(21) Appl. No.: 10/664,345

(22) Filed: Sep. 17, 2003

(65) Prior Publication Data

US 2005/0058870 A1  Mar. 17, 2005

(51) Int. Cl.
*H01M 4/86* (2006.01)
*H01M 4/88* (2006.01)
*H01M 2/08* (2006.01)

(52) U.S. Cl. .......................... 429/40; 429/30; 429/35; 429/44

(58) Field of Classification Search .................. 429/30, 429/40, 35, 44; 180/68.5
See application file for complete search history.

(56) References Cited

U.S. PATENT DOCUMENTS

| | | | |
|---|---|---|---|
| 4,755,439 A * | 7/1988 | Trocciola et al. ............. | 429/22 |
| 5,270,132 A * | 12/1993 | Breault et al. ................ | 429/35 |
| 5,651,929 A | 7/1997 | Molter et al. ................ | 264/104 |
| 5,958,616 A * | 9/1999 | Salinas et al. ................ | 429/41 |
| 6,248,469 B1 | 6/2001 | Formato et al. .............. | 429/41 |
| 6,261,711 B1 * | 7/2001 | Matlock et al. ............... | 429/34 |
| 6,408,966 B1 * | 6/2002 | Benz et al. ................ | 180/65.1 |
| 6,495,281 B1 | 12/2002 | Eshraghi ...................... | 429/40 |
| 6,517,962 B1 | 2/2003 | Knights et al. ............... | 429/13 |
| 6,630,263 B1 * | 10/2003 | McElroy ...................... | 429/30 |

OTHER PUBLICATIONS

"Membrane Durability in PEM Fuel Cells", Liu, Wen; Ruth, Kathy; Rusch, Greg, Journal of New Materials for Electrochemical Systems 4, 227-231 (2001).
"Array membrane electrode assemblies for high throughput screening of direct methanol fuel cell anode catalysts", Liu, Renxuan; Smotkin, Eugene S, Journal of Electroanalytical Chemistry 535 (2002) 49-55.

* cited by examiner

*Primary Examiner*—Tracy Dove
(74) *Attorney, Agent, or Firm*—Charles H. Ellerbrock

(57) ABSTRACT

A method of addressing one MEA failure mode by controlling MEA catalyst layer overlap, and the apparatus formed thereby is disclosed. The present invention addresses a feature of membrane electrode assembly (MEA) architecture that is associated with field failures due to the loss of ionomer from the edges of the electrolyte. To address ionomer degradation, the present invention provides a MEA design in which the cathode catalyst edges are closer than the anode catalyst edges to the edges of the electrolyte.

14 Claims, 3 Drawing Sheets

ADDRESSING ONE MEA FAILURE MODE BY CONTROLLING MEA CATALYST LAYER OVERLAP

BACKGROUND OF THE INVENTION

The present invention relates generally to proton exchange membrane (PEM) fuel cells and particularly, to a method of addressing one membrane electrode assembly (MEA) failure mode by controlling MEA catalyst layer overlap, and the apparatus formed thereby.

Proton Exchange Membrane (PEM) fuel cell systems are currently being developed for use as power supplies in numerous applications, such as transportation, distributed and portable power, and co-generation. Such systems offer promise of economically delivering power with environmental and other benefits. Generally, successful commercialization of PEM fuel cell systems will need to exhibit not only adequate reliability in operation, but also durable system performance for many years of operation.

Component degradation reduces the reliability and performance of the fuel cell. One membrane electrode assembly (MEA) failure mode that can have an adverse effect of the durability of the overall fuel cell system is ionomer degradation (membrane material loss). Aside from the loss of power associated with one or more cells failing from voltage leaks, this situation poses reliability concerns. Accordingly, the present inventors have recognized a need for improvements in MEA design in order to provide a PEM fuel cell system with the improved durability.

SUMMARY OF THE INVENTION

The present invention meets the above-mentioned needs by providing a Membrane Electrode Assembly (MEA) design that eliminates ionomer degradation by controlling catalyst layer overlap in the MEA. The present inventors have discovered that ionomer degradation at the edges of the catalyst layer only occurs in the part of the MEA where the anode catalyst extends beyond the cathode catalyst layer. The present invention eliminates ionomer degradation by designing a MEA to have the cathode catalyst edge closer than the anode catalyst edge to the edge of the flowfield plate. In practice, this means that the area of the cathode catalyst is larger than the area of the anode catalyst.

Although the present invention is not limited to specific advantages or functionality, it is noted that providing a MEA with a cathode catalyst area larger than an anode catalyst area, eliminates localized membrane failure due to ionomer loss.

In one embodiment, the invention provides a membrane electrode assembly (MEA) for a fuel cell which addresses ionomer degradation. The MEA comprises a cathode catalyst layer having a first set of edges, an anode catalyst layer having a second set of edges, and a solid polymer electrolyte provided between the cathode and anode catalyst layers. The solid polymer has an ionomer and a third set of edges. The first set of edges of the cathode catalyst layer are closer in proximity than the second set of edges of the anode catalyst layer to the third set of edges of the electrolyte.

In another embodiment, the invention provides a membrane electrode assembly (MEA) for a fuel cell which addresses ionomer degradation. The MEA comprises a cathode catalyst layer having a first set of edges, an anode catalyst layer having a second set of edges, and a solid polymer electrolyte provided between the cathode and anode catalyst layers. The solid polymer has an ionomer and a third set of edges. The anode catalyst layer has a surface area in contact with the ionomer which is less than a surface area of the cathode catalyst layer in contact with the ionomer. The first set of edges of the cathode catalyst layer are closer in proximity than the second set of edges of the anode catalyst layer to the third set of edges of the electrolyte.

In still another embodiment, the invention provides a fuel cell comprising a first electrically conductive diffusion layer, a cathode catalyst layer provided to the first diffusion layer, a second electrically conductive diffusion layer, an anode catalyst layer provided to the second diffusion layer, and a solid polymer electrolyte having an ionomer interposed between the catalyst layers. A first set of edges of the cathode catalyst layer are closer than a second set of edges of the anode catalyst layer to a third set of edges of the electrolyte, and the anode catalyst layer has a surface area less than a surface area of the cathode catalyst layer in contact with the solid polymer electrolyte. The fuel cell also includes a pair of electrically conductive flow field plates sandwiching therebetween the diffusion layers, the catalyst layers, and the solid polymer electrolyte.

In another embodiment, the invention provides a method of preparing a membrane electrode assembly for an electrochemical fuel cell which addresses ionomer degradation. The method comprises providing a solid polymer electrolyte having an ionomer and first and second surfaces, providing a cathode catalyst layer to the first surface of the electrolyte, and providing an anode catalyst layer to the second surface of the electrolyte such that a first set of edges of the cathode catalyst layer are closer than a second set of edges of the anode catalyst layer to a third set of edges of the electrolyte.

In another embodiment, the invention provides a fuel cell system comprising a fuel storage system supplying a fuel comprising hydrogen, a drive system, an energy conversion component receiving and regulating generated electricity by the fuel cell system to control the drive system, an optional temporary energy storage for storing the generated electricity, and a fuel cell powering the drive system with the fuel. The fuel cell has a cathode catalyst layer having a first set of edges, an anode catalyst layer having a second set of edges, and a solid polymer electrolyte provided between the cathode and anode catalyst layers. The solid polymer electrolyte has an ionomer and a third set of edges, and the first set of edges of the cathode catalyst layer are closer in proximity than the second set of edges of the anode catalyst layer to the third set of edges of the solid polymer electrolyte.

These and other features and advantages of the invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION OF THE EMBODIMENTS OF THE INVENTION

Fuel cells of all types experience performance losses or decay during the course of their operation. Performance loss is degradation in the voltage of the cell at a fixed current density or, conversely, a degradation of current density at a fixed voltage. Such performance losses may be the result of a variety of factors, including operating environment, component design, operating and maintenance procedures, and the kinds of materials used. Ionomer degradation is one factor that can contribute to performance loss and even premature membrane failure. Ionomer degradation in prior art membrane electrode assembly (MEA) has shown to be highly localized.

Figure 1:
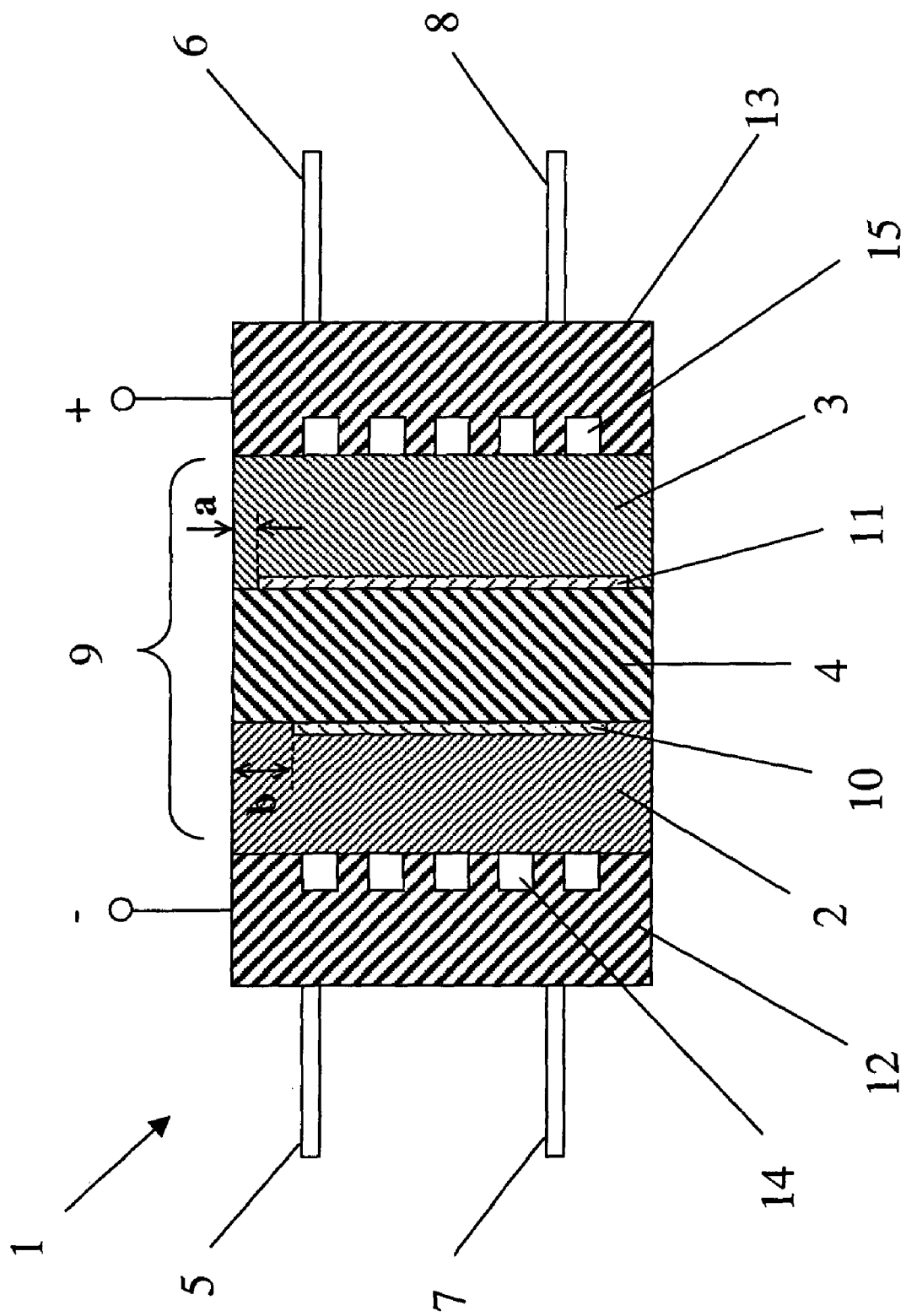
FIG. 1 is a schematic cross-section depiction of a solid polymer fuel cell in accordance with one embodiment of the present invention.

The present invention addresses ionomer degradation by controlling catalyst layer overlap in the MEA to help meet expectations for fuel cell life, one factor critical for commercial success. FIG. 1 shows a schematic cross-section diagram of a Proton Exchange Membrane (PEM) fuel cell (FC), generally referenced by symbol 1, according to the present invention. PEMFC 1 is also referred to as Solid Polymer Fuel Cell (SPFC), Solid Polymer Electrolyte Fuel Cell (SPEFC), or Ion Exchange Membrane Fuel Cell (IEMFC). The PEMFC 1 converts reactants, namely fuel and oxidant, to generate electric power and reaction products.

The PEMFC 1 comprises two porous electrically conductive electrode substrates, namely, an anode 2 and a cathode 3. Interposed between the anode 2 and the cathode 3 is an electrolyte 4 of a solid polymer membrane. In one embodiment, the solid polymer membrane comprises a perfluorinated sulfonic acid (PFSA) ionomer such as, for example, Nafion® (DuPont), Flemion (Asahi Glass Co.), or Dow XUS (Dow Chemical). The substrates of anode 2 and cathode 3 being porous, serve as gas diffusion layers for the supply of hydrogen and oxygen to the electrolyte 4, and for removal of a water vapor byproduct.

A fuel stream is supplied at fuel inlet 5 and an oxidant stream is supplied at oxidant inlet 6. The reactant streams are exhausted at fuel and oxidant outlets 7 and 8 respectively. A broad range of reactants can be used in the PEMFC 1. For example, the fuel stream may be substantially pure hydrogen gas, a gaseous hydrogen containing reformate stream, or methanol in a direct methanol fuel cell. The oxidant may be, for example, substantially pure oxygen or a dilute oxygen stream such as air.

In one embodiment, the anode 2, cathode 3 and electrolyte 4 are integrated to form a single composite structure referred to as a membrane electrode assembly (MEA) 9. Both anode and cathode 2 and 3 employ catalysts supported on carbon powders that are mounted in turn upon carbonaceous substrates, such as paper and cloth. As shown, anode 2 and cathode 3 each have a thin layer of catalyst 10 and 11, respectively, disposed at the interface with the electrolyte 4. A sublayer (not shown) is optionally used to modify certain properties of the electrode such as, for example, interface resistance between the catalyst layer and the substrate.

Catalysts 10 and 11 may be a metal black, an alloy or a supported metal catalyst. In one embodiment, catalyst 10 of anode 2 is carbon-supported Pt—Ru, and catalyst 11 of cathode 3 is carbon-supported Pt. Catalysts 10 and 11 may also contain an ionomer, such as for example, up to 30% by weight Nafion® brand perfluorosulfonic-based ionomer. The catalyst layer may also contain a binder, such as polytetrafluoroethylene.

The MEA 9 can be prepared by applying to a suitable substrate a catalyst layer for each electrode 2 and 3. If desired, a sublayer may be applied first to the substrate and then the catalyst layer onto the sublayer. These layers can be applied in the form of slurries or inks, which contain particulates and dissolved solids mixed in a suitable liquid carrier. The liquid carrier is then evaporated off to leave a layer of particulates and dispersed solids. The electrodes 2 and 3 may then be bonded to opposite sides of the electrolyte 4 via application of heat and/or pressure, or by other methods. Alternatively, catalyst layers may first be applied to the electrolyte 4 with optional sublayers and substrates incorporated thereafter, on either the catalyzed membrane or an electrode substrate.

The MEA 9 is then interposed between an anode flow field plate 12 and a cathode flow field plate 13 for directing the reactants across one surface of each electrode substrate that are disposed on each side of the MEA 9. The anode flow field plate 12 has at least one fuel flow channel 14 formed in its surface facing the anode 2, and the cathode flow field plate 13 has at least one oxidant flow channel 15 formed in its surface facing the cathode 3. When assembled against the cooperating surfaces of the electrode substrates 2 and 3, channels 14 and 15 form reactant flow field passages for the fuel and oxidant, respectively. The flow field plates 12 and 13 are also used to collect and conduct current generated by the MEA 9. Accordingly, the flow field plates 12 and 13 may be any suitable material(s) that can channel hydrogen and air through the cell, remove the water byproduct from the cell, and conduct current, such as for example, and not to be limited by, graphite bipolar plates, carbon composite bipolar plates, metal screens backed by metal foil, and the like.

During normal operation of the PEMFC 1, fuel is electrochemically oxidized at the anode catalyst 10, typically resulting in the generation of protons, electrons, and possibly other species depending on the fuel employed. The protons are conducted from the reaction sites at which they are generated, through the electrolyte 4, to electrochemically react with the oxidant at the cathode catalyst 11. The electrochemical reactions taking place are as follows:

at the anode: $H_2 \rightarrow 2H^+ + 2e^-$;
at the cathode: $\frac{1}{2}O^2 + 2H^+ + 2e^- \rightarrow H_2O$;
overall: $H_2 + \frac{1}{2}O_2 \rightarrow H_2O$.

The output voltage of each individual PEMFC 1 under load is generally below one volt. Therefore, in order to provide greater output voltage, numerous cells are usually stacked together and are connected in series to create a higher voltage fuel cell stack. End plate assemblies (not shown) are placed at each end of the stack to hold it together and to compress the stack components together. Compressive force is needed for effecting seals and making adequate electrical contact between various stack components. Fuel cell stacks can then be further connected in series and/or parallel combinations to form larger arrays for delivering higher voltages and/or currents.

For purposes of simplicity, other parts of the cell or a stack of cells, such as coolant layers, reactant flow channels, or other features of the anode and cathode for carrying fuel and oxidant to the catalyst layers and for allowing the proper movement of water throughout the cell are also not shown, as their construction and operation are well known in the art and not a part of the present invention. Additionally, the fuel cell system would include controls, not shown, for controlling and monitoring the system, such as for controlling the rates of reactant flow as determined by the requirements of the load. Furthermore, the following described embodiments of the invention are illustrated for clarity as having a rectangular form, however other polygonal shapes may be advantageously used with the invention.

A discussion on how the embodiment address ionomer degradation now follows. As shown, the distance between the edge of the electrolyte 4 and the edge of the cathode catalyst layer 11 is designated by symbol a. The distance between the edge of the anode catalyst layer 10 and the edge of electrolyte 4 is designated by symbol b. In accordance with the present invention, the relationship of these distances between edges of the catalyst layers 10 and cathode 11 relative to the edge of the electrolyte 4 is |a|<|b|. Controlling the application of the catalyst layers 10 and 11 during manufacturing to maintain the above-described edges or overlap distances eliminates ionomer degradation by having the cathode catalyst edges closer than the anode catalyst edges to the edges of the flowfield plates. In practice, this means that the surface area of the cathode catalyst layer 11 is greater than the surface area of the anode catalyst layer 10. In one embodiment, the surface area of the cathode catalyst layer 11 is 803.25 cm$^2$ and the surface area of the anode catalyst layer 10 is 768.69 cm$^2$. However, other catalyst areas are acceptable as long as the cathode catalyst layer 11 extends beyond the anode catalyst layer 10 around the entire perimeter. For example, and not to be limited to, other catalyst areas that have achieved the desired improvement in fuel cell durability are: 734.85 cm$^2$ on the cathode and 701.73 cm$^2$ on the anode; and 765 cm$^2$ on the cathode and 731.46 cm$^2$ on the anode. Accordingly, in one embodiment the catalyst areas may range from about 730 cm$^2$ to about 805 cm$^2$ on the cathode and about 700 cm$^2$ to about 770 cm$^2$ on the anode, wherein the surface area of the cathode is about 32 cm$^2$ to about 36 cm$^2$ greater than the surface area of the anode.

Catalyst layers and MEA 9 thicknesses can also vary. In one embodiment, the catalyst layers 10 and 11 have thicknesses in the range of about 8 to about 10 microns, and the MEA 9 has a thickness in the range of about 34 to about 41 microns. However, one skilled in the art could see obvious extensions to other thicknesses. The situation is the same for distances a and b from the edge of the catalyst layers to the edge of the electrolyte 4. In one embodiment, distances a and b on a non-die cut MEA 9 had a range from about 47 mm to about 58 mm.

Figure 2:
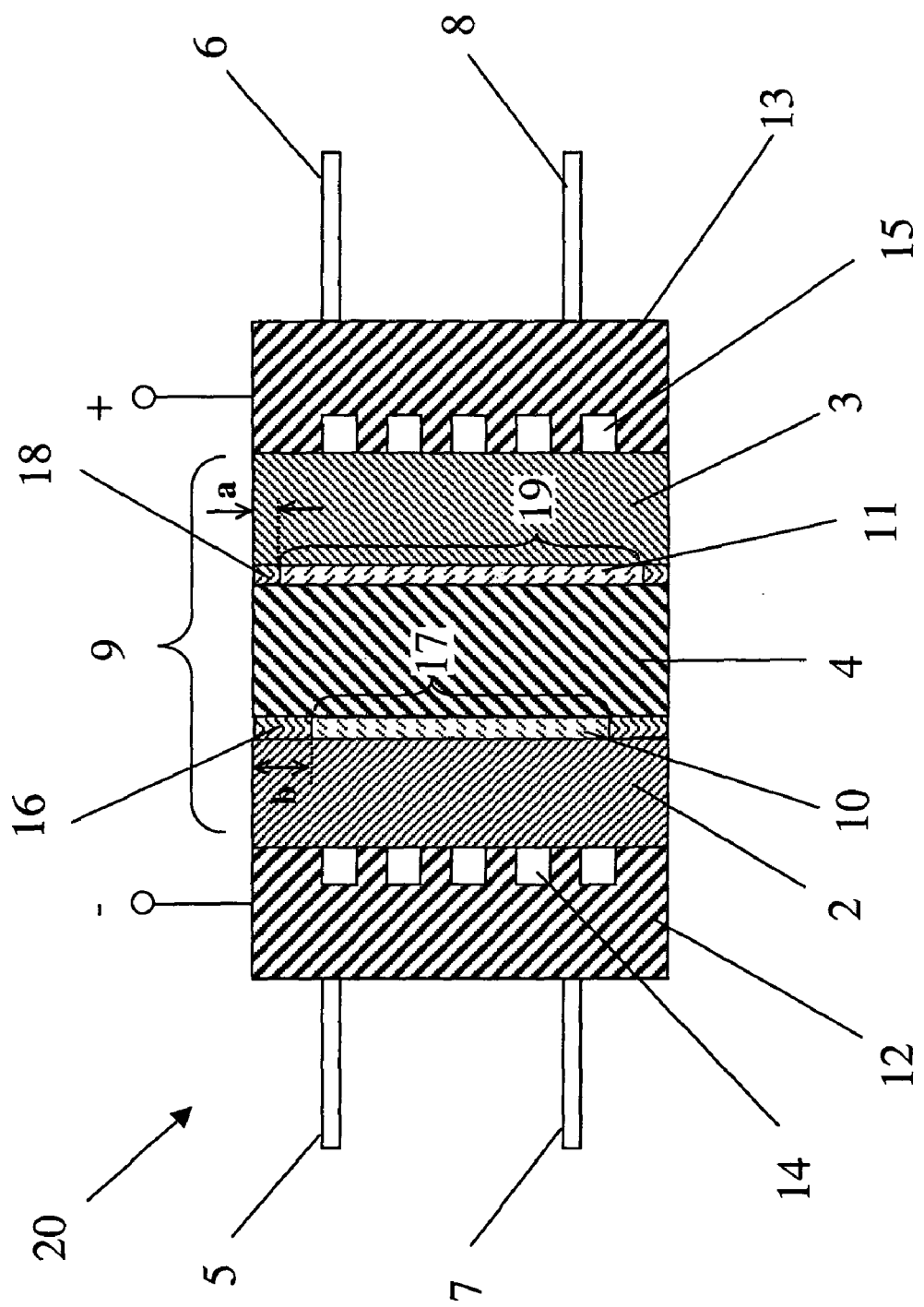
FIG. 2 is a schematic cross-section depiction of a solid polymer fuel cell in accordance with another embodiment of the present invention.

FIG. 2 is a schematic cross-section depiction of a PEMFC in accordance with another embodiment of the present invention, and is generally depicted by symbol 20. Reference numerals which are the same as those used in FIG. 1 represent the same components. As shown in this alternative arrangement, a first gasket 16 is provided between the anode 2 and electrolyte 4. A window area 17 of the first gasket 16 sizes the surface area of anode catalyst layer 10 in contact with the electrolyte 4 while forming a separation of distance b around the perimeter of the catalyst 10 from the edges the flow field plate 12. Optionally, a second gasket 18 is similarly provided to size the surface area of the cathode catalyst layer 17 via a second window area 19 and provides a separation of distance a, wherein the relationship a<b is provided between gaskets 16 and 18. It is to be appreciated that the surface area of the cathode catalyst layer 11 in contact with the electrolyte 4, with or without gasket 18, is greater than the surface area of the anode catalyst layer 10 in contact with the electrolyte 4. However, it is to be appreciated that the gaskets 16 and 18 need not perfectly size the edges of the catalyst layers. In fact, the distance between the edges of each catalyst and its respective gasket can vary by many millimeters.

The above-disclosed MEAs 9 according to the present invention may employ a conventional cathode having carbon supported platinum catalyst applied to a porous carbon fiber paper substrate (TGP-090 grade from Toray), and a conventional Nafion® brand solid polymer membrane. The anodes may also be a conventional carbon-supported platinum-ruthenium catalyst (Pt/Ru alloy in a weight ratio of 20/10 supported on carbon black) applied to a porous carbon fiber paper substrate (TGP-090 grade from Toray). The present invention may be used with different, more water absorbing ionomers, such as a trifluorostyrene-based composition, hydrophobic polytetrafluoroethylene (PTFE), and combinations thereof.

Figure 3:
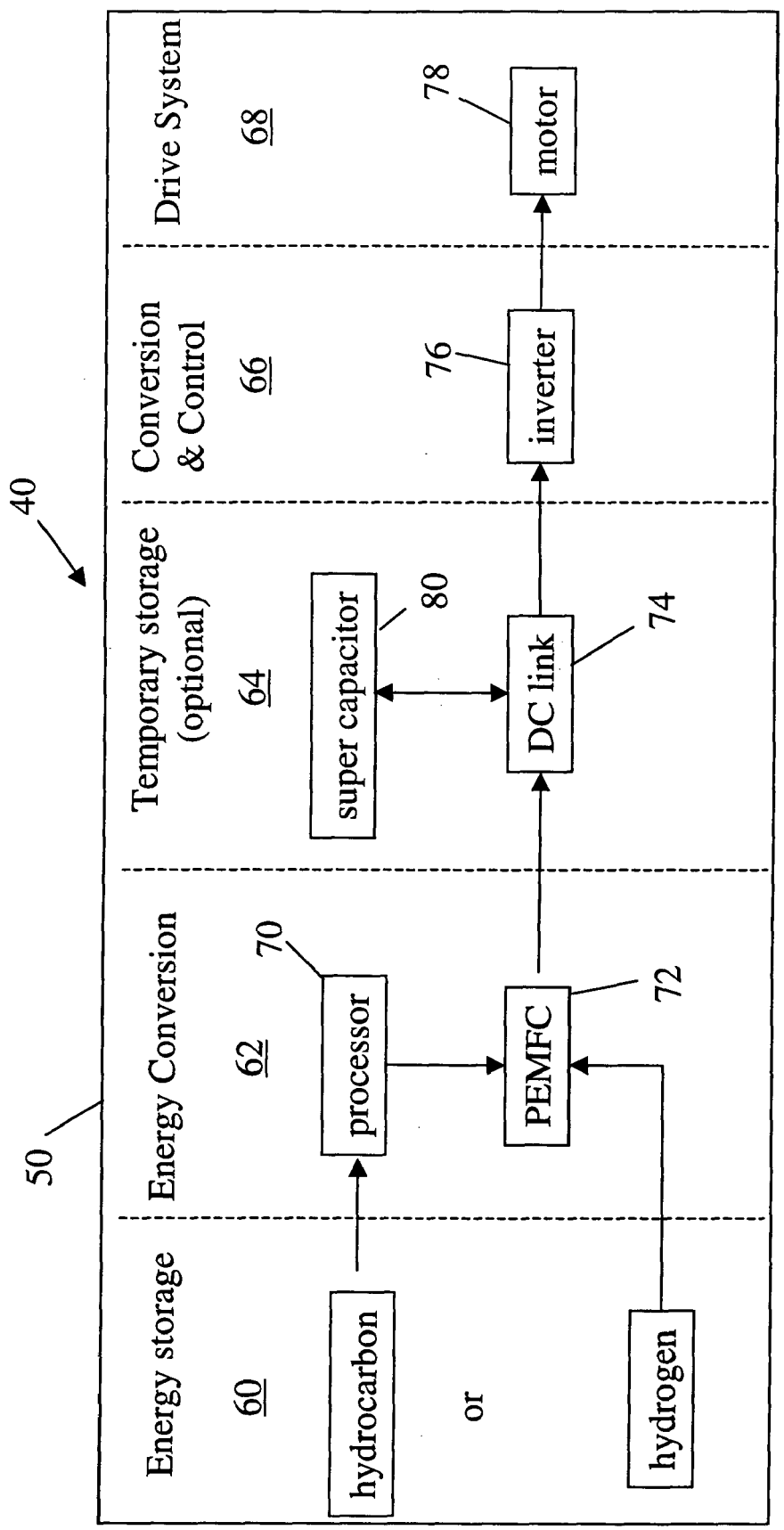
FIG. 3 is a schematic depiction of a PEM fuel cell system in accordance with an embodiment of the present invention.

With reference to FIG. 3, a PEMFC according to the present invention may be used advantageously in a fuel cell system 40, such as for an automobile which is depicted by symbol 50. In this embodiment depicted, the fuel cell system 40 includes a fuel supply system 60, an energy conversion component 62, optional temporary energy storage 64, a conversion and control component 66, and a drive system 68. The fuel supply system 60 may be a simple cylinder containing compressed hydrogen and a pressure controller. The use of liquid hydrogen or metal hydrides makes the system somewhat less simple, since heat must be provided to the tank. If instead of hydrogen a hydrocarbon is used as a fuel, the fuel supply system becomes more complicated. In this case, a fuel processor (fuel reformer and gas purifier) 70 is required in the energy conversion component 62 to provide hydrogen for the PEM fuel cells 72.

The electrical energy produced by the fuel cells 72 can be fed via a DC link 74 to a motor invertor 76 in the conversion and control component 66 directly. The output of the inverter 76 then drives a motor 78 in the drive system. In some cases, it may be attractive to use a buffer system 80, such as a battery, super capacitor or flywheel. The buffer system 80 will supply peak power. This may be needed during start-up, or during acceleration. The buffer system 80 can also be used to absorb energy during regenerative braking.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. A device comprising a membrane electrode assembly wherein said membrane electrode assembly comprises:
    a cathode catalyst layer having a first set of edges;
    an anode catalyst layer having a second set of edges;
    a solid polymer electrolyte provided between said cathode and anode catalyst layers, said solid polymer having an ionom1er and a third set of edges, wherein said anode catalyst layer has a surface area in contact with said ionomer which is less than a surface area of said cathode catalyst layer in contact with said ionomer, and said first set of edges of said cathode catalyst layer are closer in proximity than said second set of edges of said anode catalyst layer to said third set of edges of said electrolyte; and first and second diffusion layers, wherein the surface areas of said catalyst layers in contact with said ionomer are sized entirely by gaskets interposed between said electrolyte and said diffusion layers.

2. The device as recited by claim 1 wherein the surface area of the cathode catalyst layer ranges from about 730 cm$^2$ to about 805 cm$^2$ and the surface area of the anode catalyst layer ranges from about 700 cm$^2$ to about 770 cm$^2$.

3. The device as recited by claim 1 wherein a difference between the surface areas of the cathode and anode catalyst layers ranges from about 32 cm$^2$ to about 36 cm$^2$.

4. The device as recited by claim 1 wherein spacing of said first set of edges of said cathode catalyst layer and said second set of edges of said anode catalyst layer to said third set of edges of said electrolyte range from about 47 mm to about 58 mm.

5. The device as recited by claim 1 wherein the catalyst layers have thicknesses in the range of about 8 to about 10 microns.

6. The device as recited by claim 1 wherein the membrane electrode assembly has a thickness in the range of about 34 to about 41 microns.

7. The device as recited by claim 1 wherein said membrane electrode assembly is incorporated into a fuel cell comprising:
 a pair of electrically conductive flow field plates sandwiching therebetween said diffusion layers, said catalyst layers, and said solid polymer electrolyte.

8. The device as recited by claim 7 wherein the surface area of the cathode catalyst layer ranges from about 730 cm$^2$ to about 805 cm$^2$ and the surface area of the anode catalyst layer ranges from about 700 cm$^2$ to about 770 cm$^2$.

9. The device as recited by claim 7 wherein a difference between the surface areas of the cathode and anode catalyst layers ranges from about 32 cm$^2$ to about 36 cm$^2$.

10. The device as recited by claim 7 wherein said fuel cell is incorporated into a fuel cell system comprising:
 a fuel storage system supplying a fuel comprising hydrogen;
 a drive system;
 an energy conversion component receiving and regulating generated electricity by the fuel cell system to control said drive system; and
 an optional temporary energy storage for storing the generated electricity.

11. The device as recited by claim 10 wherein said fuel cell system further comprising a fuel processor for converting said fuel into a hydrogen rich stream for said fuel cell.

12. The device as recited by claim 10 wherein said device is an automobile.

13. The device as recited by claim 10 wherein the surface area of the cathode catalyst layer ranges from about 730 cm$^2$ to about 805 cm$^2$ and the surface area of the anode catalyst layer ranges from about 700 cm$^2$ to about 770 cm$^2$, and wherein a difference between the surface areas of the cathode and anode catalyst layers ranges from about 32 cm$^2$ to about 36 cm$^2$.

14. A method of preparing a membrane electrode assembly comprising:
 providing a solid polymer electrolyte having an ionomer, said solid polymer electrolyte having first and second surfaces;
 providing a cathode catalyst layer to the first surface of said electrolte;
 providing an anode catalyst layer to the second surface of said electrolyte such that a first set of edges of said cathode catalyst layer are closer than a second set of edges of said anode catalyst layer to a third set of edges of said electrolyte, and such that a total surface area of said anode catalyst layer is smaller than a total surface area of said cathode catalyst layer;
 providing gaskets; and
 providing first and second diffusion layers, wherein the surface areas of said catalyst layers in contact with said ionomer are sized entirely by said gaskets interposed between said electrolyte and said diffusion layers.

* * * * *